(12) United States Patent
Pu et al.

(10) Patent No.: US 9,736,852 B2
(45) Date of Patent: Aug. 15, 2017

(54) METHOD OF PROCESSING RECEIVED DIGITIZED SIGNALS AND MOBILE RADIO COMMUNICATION TERMINAL DEVICE

(71) Applicant: Intel Corporation, Santa Clara, CA (US)

(72) Inventors: Tian Yan Pu, Dresden (DE); Honglei Miao, Nuremberg (DE)

(73) Assignee: INTEL CORPORATION, Santa Clara, CA (US)

( * ) Notice: Subject to any disclaimer, the term of this patent is extended or adjusted under 35 U.S.C. 154(b) by 293 days.

(21) Appl. No.: 14/580,243

(22) Filed: Dec. 23, 2014

(65) Prior Publication Data

US 2016/0183272 A1 Jun. 23, 2016

(51) Int. Cl.
*H04W 72/08* (2009.01)
*H04W 40/12* (2009.01)
(Continued)

(52) U.S. Cl.
CPC ........ *H04W 72/085* (2013.01); *H04B 17/318* (2015.01); *H04W 24/08* (2013.01);
(Continued)

(58) Field of Classification Search
CPC ....... H04L 1/0002; H04L 1/20; H04L 7/0083; H04L 7/0087; H04L 27/2662;
(Continued)

(56) References Cited

U.S. PATENT DOCUMENTS

2007/0099652 A1 5/2007 Lindoff et al.
2009/0163204 A1 6/2009 Farnsworth et al.
(Continued)

FOREIGN PATENT DOCUMENTS

| CN | 102196471 A | 9/2011 |
| EP | 2624618 A1 | 8/2013 |
| WO | 2010031725 A1 | 3/2010 |

OTHER PUBLICATIONS

Office Action received for corresponding TW Application No. 104138137 dated Sep. 12, 2016, 11 pages, including its English Translation of 5 pages.

(Continued)

*Primary Examiner* — Ashley Shivers
(74) *Attorney, Agent, or Firm* — Viering, Jentschura & Partner mbB

(57) ABSTRACT

A method for performing a mobile radio cell search may include receiving one or more wireless signals from one or more mobile radio cells as part of a first partial mobile radio cell search; determining a reliability metric and a mobile radio cell detection occurrence count for each of the one or more mobile radio cells based on the one or more received wireless signals; and performing a second partial mobile radio cell search for one or more mobile radio cells having a reliability metric or mobile radio cell detection occurrence count that satisfies a predefined condition. Alternatively, a method for performing a mobile radio cell search may include performing a second partial mobile radio cell search only for mobile radio cells having a reliability metric that satisfies a predefined condition.

20 Claims, 9 Drawing Sheets

(51) Int. Cl.
*H04W 72/12* (2009.01)
*H04B 17/318* (2015.01)
*H04W 24/08* (2009.01)
*H04W 48/16* (2009.01)

(52) U.S. Cl.
CPC .......... *H04W 40/12* (2013.01); *H04W 48/16* (2013.01); *H04W 72/1231* (2013.01)

(58) Field of Classification Search
CPC ......... H04W 36/0083; H04W 36/0088; H04W 36/0094; H04W 28/0257; H04W 28/04; H04W 56/00; H04W 56/0005; H04W 56/001; H04W 56/0015; H04W 56/002; H04W 56/0025; H04W 56/003; H04W 56/0035; H04W 56/004; H04W 56/0045; H04W 56/005; H04W 56/0055; H04W 56/006; H04W 56/0065; H04W 56/007; H04W 56/0075; H04W 56/008; H04W 56/0085; H04W 56/009; H04W 56/0095; H04W 76/00; H04W 76/02; H04W 76/021; H04W 36/30; H04W 40/125; H04W 40/12; H04W 40/24; H04W 72/02; H04W 72/04; H04W 72/085; H04W 72/1231; H04B 1/7073; H04B 1/7087; H04B 1/7156; H04B 1/7183; H04B 2201/7073; H04B 7/18589; H04B 7/19; H04B 7/2125; H04H 60/50; H04J 3/062; H04J 3/0623; H04J 3/0632; H04J 3/0635; H04J 3/0638; H04J 3/0647; H04J 3/0652; H04J 3/0658; H04J 3/0685; H04J 3/0691; H04J 3/0694; H04J 3/0697; H04J 3/125; H04J 3/1611; H04J 25/247; H04J 3/0605; H04J 3/0614; H04J 3/0617; H04J 3/0655; H04J 3/0661; H04M 2201/22

See application file for complete search history.

(56) References Cited

U.S. PATENT DOCUMENTS

| | | | |
|---|---|---|---|
| 2010/0226264 A1 | 9/2010 | Axmon et al. | |
| 2011/0076958 A1* | 3/2011 | Fukushi | H04W 48/16 455/67.11 |
| 2012/0015653 A1 | 1/2012 | Paliwal et al. | |
| 2012/0231790 A1* | 9/2012 | Lindoff | H04W 48/16 455/434 |

OTHER PUBLICATIONS

Extended European Search Report for corresponding EP Patent Application Serial No. 15195266.0, dated Jun. 6, 2016, 8 pages.

* cited by examiner

METHOD OF PROCESSING RECEIVED DIGITIZED SIGNALS AND MOBILE RADIO COMMUNICATION TERMINAL DEVICE

TECHNICAL FIELD

Various aspects of this disclosure relate generally to a method for performing a mobile radio cell search for use in mobile communications.

BACKGROUND

A mobile radio communication device such as a user equipment (UE) should continuously monitor and update a known set of nearby mobile radio cells in order to maintain a robust communication link with a provider network. Accordingly, conventional UEs periodically measure and evaluate signals received from neighboring mobile radio cells in order to update the set of nearby radio cells. In a Long Term Evolution (LTE) system, this mobile radio cell search and detection process is typically based on an analysis of synchronization sequences such as primary synchronization signals (PSSs) and secondary synchronization sequences (SSSs) that are broadcast by each mobile radio cell. In addition to evaluating synchronization sequences contained in received signals, UEs may also calculate the reference signal receive power (RSRP) and reference signal received quality (RSRQ) of signals received from nearby mobile radio cells.

A UE typically maintains a current list of nearby mobile radio cells and associated mobile radio channel characteristics by periodically updating a stored set of mobile radio cell characteristics based on an evaluation of received mobile radio signals. This list of nearby mobile radio cells is conventionally used for a variety of purposes, such as reporting measurement results to the mobile radio communication network in order to support effective mobility management.

Two different methods are conventionally used for such a mobile radio cell search and measurement process. The first method dedicates a relatively large period of time to analyze each nearby detected mobile radio cell. For example, a UE implementing the first method may spend about 60 ms to 70 ms dedicated to receiving data from a single mobile radio cell. A UE will utilize a number of consecutively received signals, such as by averaging several successive synchronization sequences, to generate a single detection mobile radio cell search result. This method potentially provides a strong detection rate due to the large period of time dedicated to analyzing a single mobile radio cell. However, this method requires committing a significant amount of resources and time to obtain a single mobile radio cell search result, thereby resulting in drawbacks in memory consumption and power efficiency.

In contrast to the first method, the second conventional method devotes a relatively small time window to receive signals from a given mobile radio cell. Instead of analyzing a lengthy, continuous stream of data from a given mobile radio cell, the second method instead relies on short bursts, e.g. one or two half frames of data, to detect whether a signal is being broadcast from a given mobile radio cell. The second method makes a determination whether the mobile radio cell is present or not and quickly cycles to a new mobile radio cell. By repeating this process, the second method cycles through a set of potential candidate mobile radio cells and continuously updates the number of detection occurrences of each mobile radio cell, i.e. how many times each mobile radio cell is detected. A mobile radio cell that is detected multiple times is determined to be a valid nearby mobile radio cell, while those detected once or less are ignored.

The second method offers several advantages over the first method such as greater scheduling flexibility and power efficiency as well as reduced power consumption. Despite only utilizing short reception windows, the second method can achieve both a comparable detection rate and false alarm rate to the RSRP/RSRQ-based first method. However, the average new mobile radio cell detection time is always longer than the time interval of two adjacent mobile radio cell search events as a new mobile radio cell must be measured at least twice in order to yield a valid nearby mobile radio cell result. Therefore, the time spent on mobile radio cell search and measurement may disadvantageously long.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

The time spent on a mobile radio cell search and measurement process may be reduced by adjusting the criteria used to schedule a mobile radio cell for measurement. A UE may obtain an initial measurement representing the reliability of a mobile radio cell and subsequently schedule for the mobile radio cell for further analysis. A UE may also schedule a mobile radio cell for further analysis if the mobile radio cell is detected multiple times over a predefined time period.

Figure 1:
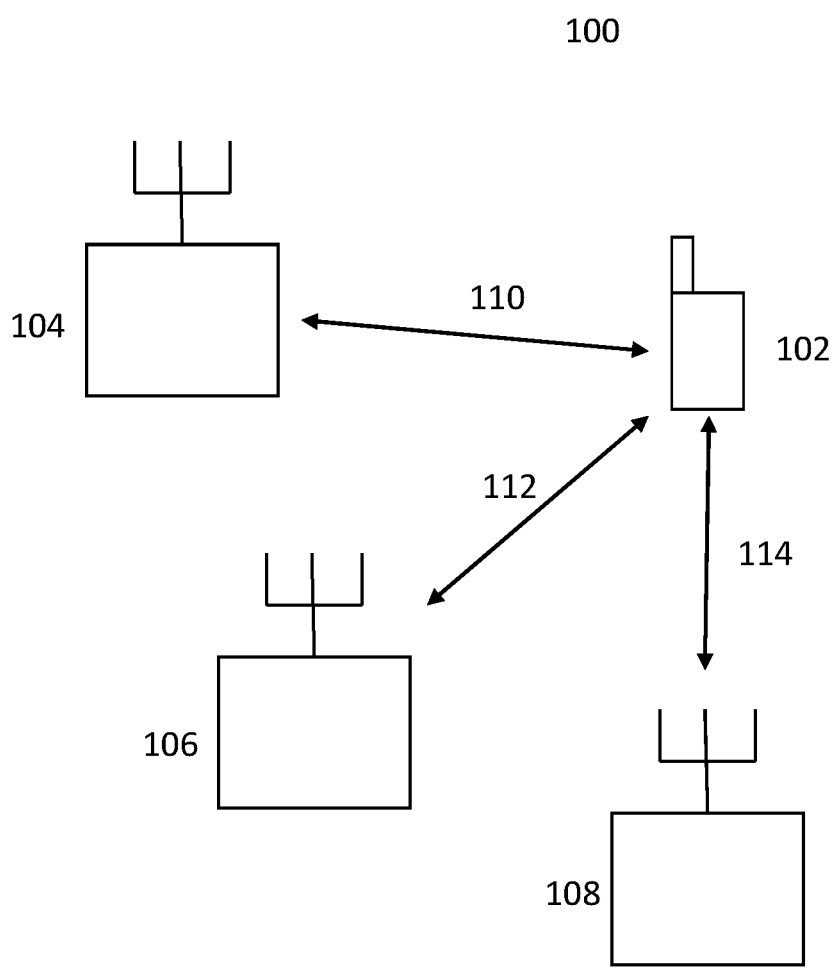
FIG. 1 shows a mobile radio communication system.

FIG. 1 shows mobile radio communication system 100. Mobile radio communication terminal device 102 such as e.g. User Equipment (UE) 102 may receive a plurality of radio signals from one or more base stations such as e.g. NodeBs or eNodeBs 104, 106, and 108, e.g. via respective air interfaces 110, 112, and 114. It is to be noted that although the further description uses a configuration of the mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP ($4^{th}$ Generation Partnership Project) mobile radio communication system, and the like.

Each of base stations 104, 106, and 108 may transmit a plurality of radio signals via air interfaces 110, 112, and 114. Base stations 104, 106, and 108 may utilize one or more mobile radio cells, where each mobile radio cell may transmit a unique wireless signal. Accordingly, UE 102 may receive a plurality of mobile radio signals from different mobile radio cells over air interfaces 110, 112, and 114. Each mobile radio cell may be located at one of base stations 104, 106, and 108.

Air interfaces 110, 112, and 114 may exhibit varying transmission quality over time. For example, fluctuating channel conditions for one of air interfaces 110, 112, or 114 may result in a stronger or weaker wireless communication link between one of bases stations 104-108 and UE 102. The quality of the signal received by UE 102 may consequently vary with time.

Figure 2:
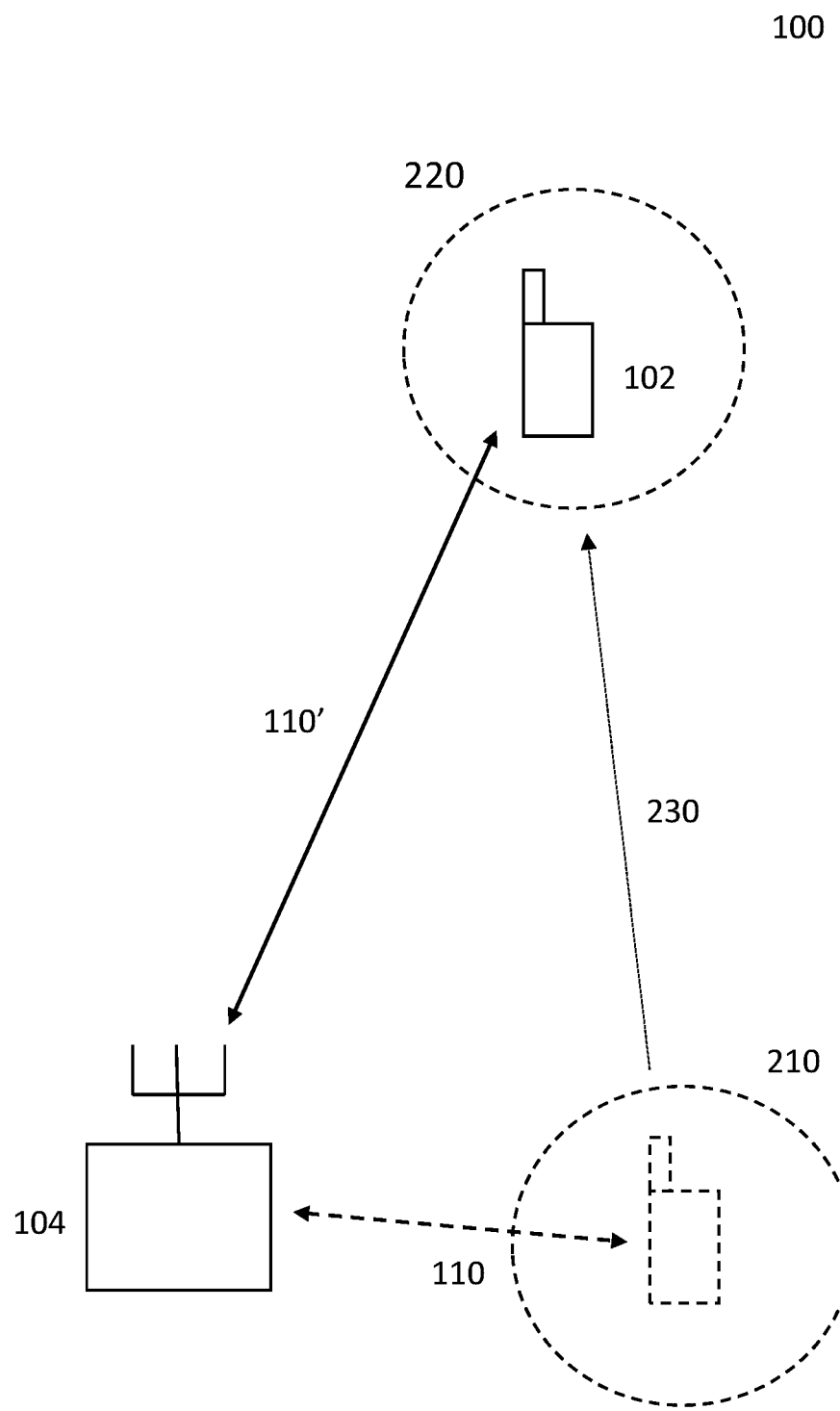
FIG. 2 shows a scenario of mobile device movement in a mobile radio communication system.

The transmission quality between one of base stations 104, 106, or 108 and UE 102 may be influenced by the location of UE 102. For example, UE 102 may be physically re-located to a new location, which may also alter the characteristics of air interfaces 110-114. FIG. 2 shows an exemplary scenario where UE 102 has moved from an original location 210 (similar to as shown in FIG. 1) to new location 220 along movement path 230. Accordingly, the new transmission path has altered the original air interface 110 of FIG. 1 to be modified air interface 110'. The transmission characteristics of modified air interface 110' may be different than air interface 110.

For example, new location 220 may be further away from base station 104 than original location 210. Modified air interface 110' may cover a greater radial distance, thereby altering transmission characteristics such as e.g. decreasing received signal power or received signal quality. Alternatively, new location 220 may be closer to base station 104 than original location 210. Accordingly, modified air interface 110' may cover a shorter radial distance, thereby e.g. increasing received signal power or received signal quality. These situations are exemplary in nature, and numerous changes in transmission characteristics are possible given a change in transmission path. For example, modified air interface 110' may have a shorter transmission path than air interface 110 but exhibit a decrease in transmission quality indicators. Alternatively, UE 102 may remain in the same location, e.g. original location 210, and still experience changes in reception quality over a substantially unchanged air interface 110. In other words, a stationary UE 102 may experience time-dependent fluctuations in wireless reception regardless of physical location. Nevertheless, a change in air interface from air interface 110 to modified air interface 110' may affect the quality of wireless signals received at UE 102. Additionally, a physical re-location of UE 102 may also modify air interfaces 112 and 114 of base stations 106 and 108, which is not shown.

Figure 3:
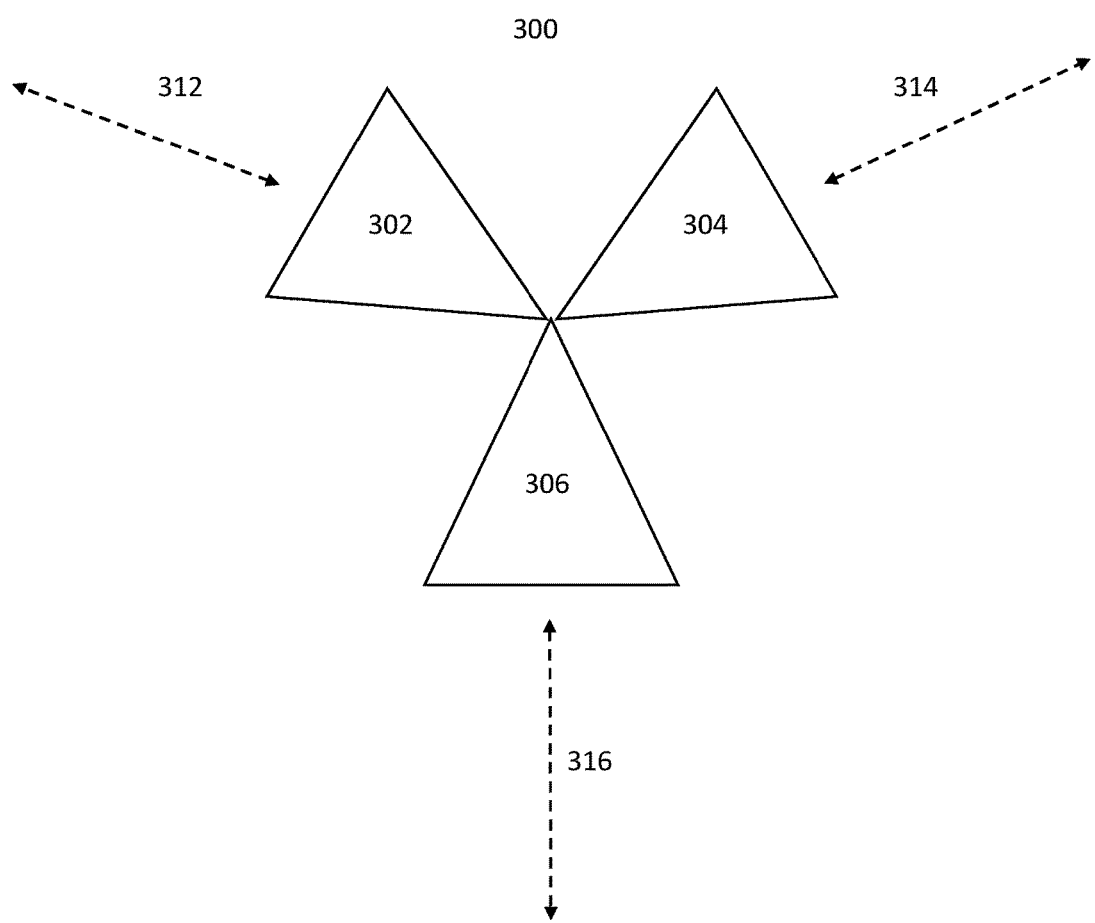
FIG. 3 shows a base station with three cell sectors.

As previously detailed, each base station 104, 106, and 108 may broadcast one or more unique signals over air interfaces 110, 112, and 114. For example, base station 104 may broadcast one or more signals over air interface 110 using one or more mobile radio cells. An exemplary base station 300 having multiple mobile radio cells is shown in FIG. 3. Base station 300 is shown as having mobile radio cells 302, 304, and 306, although such an exemplary base station may be configured to have any number of mobile radio cells. Each of mobile radio cells 302, 304, and 306 may transmit a wireless signal over one of respective air interfaces 312, 314, and 316. Each of mobile radio cells 302, 304, and 306 may transmit a unique wireless signal, or alternatively may transmit the same wireless signal.

A UE 102 such as shown in FIG. 2 may therefore receive a plurality of wireless signals of air interface 110 depending on the configuration of base station 104. For example, base station 104 may be configured similarly to base station 300, and accordingly may wirelessly transmit three wireless signals from three mobile radio cells such as e.g. mobile radio cells 302, 304, and 306. Accordingly, UE 102 may receive three wireless signals from base station 104 over air interface 110. As previously detailed, air interface 110 may exhibit varying transmission characteristics, which may affect the wireless communication quality between base station 104 and UE 102. Accordingly, the wireless signals received from each of mobile radio cells 302, 304, and 306 may vary in quality. For example, air interface 110 may be altered to modified air interface 110' when UE 102 moves from original location 210 to new location 220 as in FIG. 2. Accordingly, base station 104 as shown in FIG. 2 may be configured similarly to base station 300 shown in FIG. 3 to wirelessly transmit radio signals with multiple mobile radio cells. A physical re-location of UE 102 from original location 210 to new location 220 may affect the transmission quality of one or more of mobile radio cells 302, 304, and 306. For example, UE 102 at new location 220 may receive wireless signals from mobile radio cells 302, 304, and 306 at a lower receive signal power than when UE 102 was located at original location 210. Alternatively, a wireless signal from mobile radio cell 302 may be unchanged, while a wireless signal from mobile radio cell 304 may experience a drop in reception quality. In a further alternative example, a wireless signal from mobile radio cell 302 may exhibit an increase in reception quality at UE 102, while wireless signals from mobile radio cells 304 and 306 may be received at a lower reception quality. UE 102 may alternatively remain stationary at location 210 and still observe fluctuating reception quality for signals received from mobile radio cells 302, 304, and 306.

Conventional wireless communication networks may exhibit variations in communication quality as detailed in the exemplary scenarios above. Consequently, wireless communication networks must continuously measure and report the quality of wireless transmission links in order to operate effectively. A wireless communication network may then use the resulting data for a variety of operations in order to optimize the experience of network subscribers.

One particular component of wireless network monitoring involves evaluating wirelessly received signals at a mobile device and characterizing the respective wireless source. This process, known as mobile radio cell search/detection and measurement, maintains a list of detected mobile radio cells. A mobile radio cell that a wireless transmission is received from may be considered "detected", i.e. that it is transmitting a receivable signal to the mobile device. The list of detected mobile radio cells may additionally be associated with information indicating the quality of wireless communication between the mobile device and a respective mobile radio cell. For example, a mobile station may perform a mobile radio cell search, which involves tuning to various radio frequencies and attempting to associate any received wireless signals with their respective transmitting mobile radio cell. A mobile station performing a mobile radio cell search may receive a wireless signal and process it in order to identify which mobile radio cell transmitted the wireless signal. Accordingly, a mobile station may determine that the identified mobile radio cell is a nearby transmitting mobile radio cell, and may save the identification of the mobile radio cell for further use such as e.g. handovers or carrier aggregation.

In addition to documenting the identity of the detected mobile radio cell, a mobile device may also perform an analysis on a received signal in order to determine the reception quality of any signals transmitted by the detected mobile radio cell. For example, conventional communication protocols may involve measuring the reference signal receive power (RSRP) or reference signal receive quality (RSRQ) of any received signals in order to determine a quantitative metric representing the communication link quality between a mobile device and a given mobile radio cell. Alternatively, a conventional protocol may include periodically cycling reception between multiple mobile radio cells and maintaining a count of how many times a particular mobile radio cell was detected. High resulting measurements for RSRP/RSRQ or a high detection occurrence count may be interpreted to indicate that a cell qualifies as a valid nearby cell that may offer a high quality of wireless communication.

As previously detailed, these conventional methods have disadvantages including a relatively long average mobile radio cell detection time. For example, the first method utilizing lengthy RSRP/RSRQ measurements may require averaging a number of consecutive reference signals, such as synchronization sequences, that are broadcast from a mobile radio cell. This averaging operation can require large amounts of receive data, and requires a continuous dedicated reception time window during which other operations may not be executed. Therefore, a lengthy average cell detection time in addition to limited flexibility in performing other operations render the first method sub-optimal.

The second method, while providing greater scheduling flexibility and power efficiency than the first method, is also disadvantageous due to a long average mobile radio cell detection time. For example, a conventional implementation of this method periodically cycles through reception periods for multiple mobile radio cells. A mobile station may search for a signal from a given mobile radio cell during each time period, and increment a detection counter associated with a mobile radio cell if the mobile radio cell is detected. The time period spent detecting an occurrence of each mobile radio cell in this method is relatively small compared to the lengthy time periods devoted to measuring each mobile radio cell as in the first method. A mobile radio cell that is detected multiple times (or alternatively a certain number of times out of a given number of cycles) may then be identified and documented as a valid nearby mobile radio cell. This second method achieves a comparable detection rate to the first method, despite using a relatively simplistic approach of counting mobile radio cell detections. This approach does offer greater flexibility as only short time windows are used, thereby allowing more opportunities to schedule other operations in between periodic reception periods. However, the average mobile radio cell detection time is still inadequately long as a given mobile radio cell must be cycled through multiple times in order to obtain multiple detections.

Figure 4:
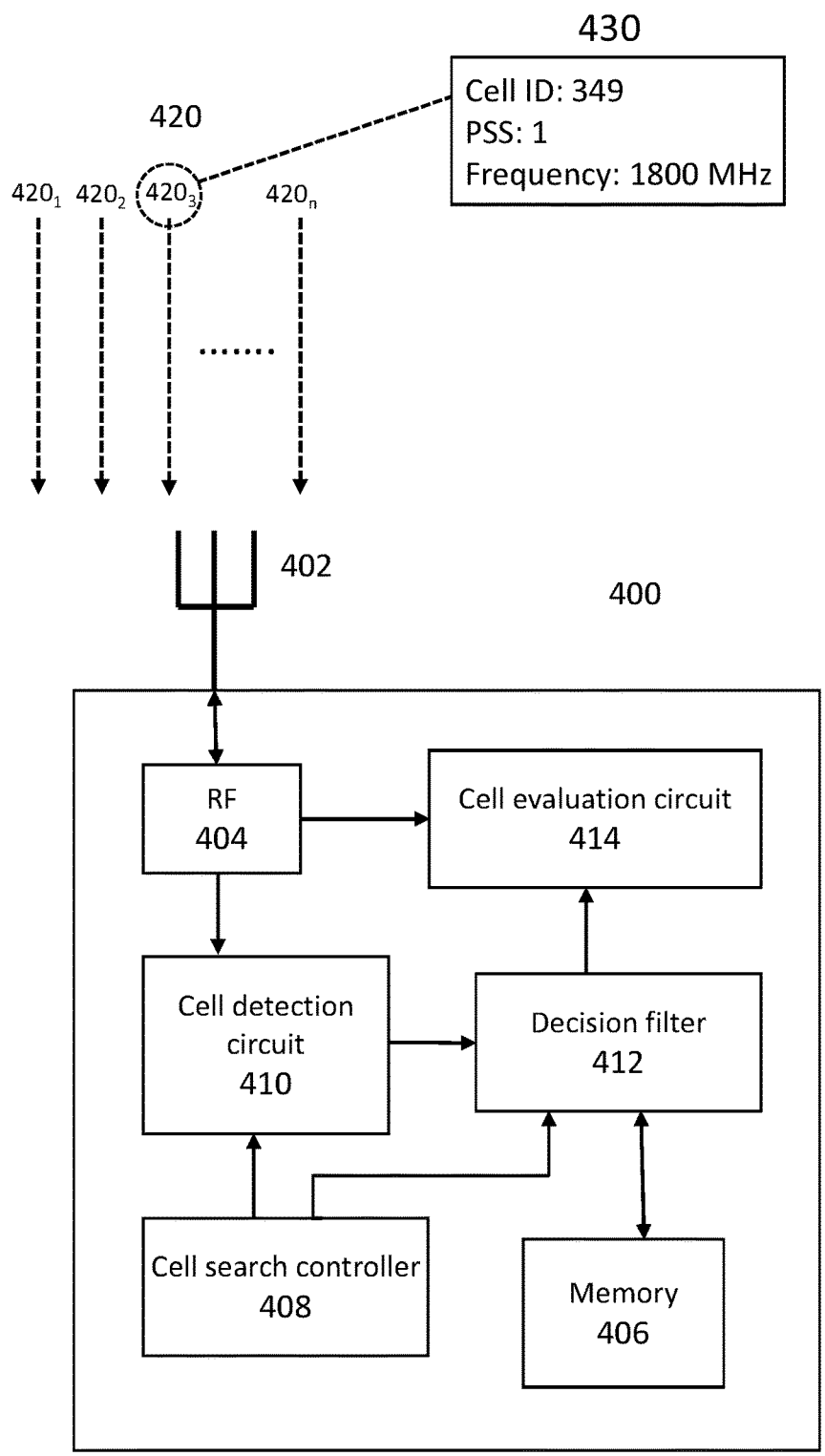
FIG. 4 shows various components and circuits of the UE of FIG. 1.

FIG. 4 shows a mobile communication terminal 400 according to an exemplary aspect of the disclosure. UE 400 may include antenna 402, RF transceiver 404, memory 406, mobile radio cell search controller 408, mobile radio cell detection circuit 410, decision filter 412, and mobile radio cell evaluation circuit 414. It is to be noted that although the further description uses a configuration of the mobile radio communication system 100 in accordance with Long Term Evolution (LTE) or in accordance with Long Term Evolution Advanced (LTE-A) for explanation, any other mobile radio communication system 100 may be provided, such as any 3GPP ($3^{rd}$ Generation Partnership Project) mobile radio communication system (e.g. in accordance with Universal Mobile Telecommunications System (UMTS)), 4GPP ($4^{th}$ Generation Partnership Project) mobile radio communication system, and the like.

UE 400 may receive wirelessly transmitted signals with antenna 402. For example, UE 400 may receive n wireless signals 420 as shown in FIG. 4. Wireless signals 420 may be transmitted from one or more base stations, such as e.g. base stations 104-108 as shown in FIG. 1. One or more of wireless signals 420 may be transmitted from a different mobile radio cell. In an exemplary aspect of the disclosure, each of wireless signals 420 may be wirelessly transmitted from a different mobile radio cell.

Antenna 402 may be coupled to RF transceiver 404, which may be configured to process and digitize the received wireless signals 420 and provide the resulting digitized signals to various other components in UE 400. For example, RF transceiver 404 may be coupled to mobile radio cell detection circuit 410 and mobile radio cell evaluation circuit 414, and accordingly may provide any resulting received digitized signals thereto. Alternatively, RF transceiver 404 may provide received digitized signals to memory 406 (not explicitly shown in FIG. 4) where they may be stored for later processing. In an exemplary aspect of the disclosure, received digitized signals may be stored in memory 406 and provided to mobile radio cell detection circuit 410 and/or mobile radio cell evaluation circuit 414 for processing at a later time. Memory 406 may be any of a variety of memory types, such as volatile (RAM, DRAM, SRAM, etc.) or non-volatile (ROM, hard drive, optical drive, etc.). Memory 406 may also be implemented as a wideband data buffer.

RF transceiver 404 may also provide for the transmission of radio signals by e.g. modulating digital signals to analog RF signals. Antenna 402 may then transmit the analog RF signals over an air interface to an externally located receiver, such as e.g. a base station.

RF transceiver 404 may selectively receive wireless signals over different carrier frequencies and provide a baseband, digitized output signal to mobile radio cell detection circuit 410.

For example, RF transceiver 404 may periodically cycle through multiple carrier frequencies and provide a resulting received digitized signal to cell detection circuit 410 during each reception time period as part of the mobile radio cell search and measurement process. Cell detection circuit 410 may then process the digitized signal provided from RF transceiver 404 to identify the mobile radio cell that transmitted the associated wireless signal. For example, conventional wireless communication systems may assign a numerical identifier to all mobile radio cells. This numerical identifier may be embedded in a wireless signal transmitted from a given mobile radio cell. Accordingly, UE 400 may decode the wireless signal and identify the transmitting mobile radio cell using mobile radio cell detection circuit 410.

Cell detection circuit 410 may also determine timing and frequency information from the received digitized signal. For example, base stations in conventional wireless networks may transmit a synchronization sequence such as a primary synchronization signal (PSS) or secondary synchronization signal (SSS). A mobile station such as UE 400 may utilize a received synchronization sequence to synchronize timing with the base station and the supporting core network. For example, UE 400 may utilize an extracted PSS or SSS to identify the scheduled data frames when a particular mobile radio cell is transmitting a wireless signal.

Cell detection circuit 410 may additionally identify the frequency which a given mobile radio cell is using for wireless transmission, e.g. the carrier channel center frequency. For example, RF transceiver 404 may utilize antenna 402 to tune to a selected carrier frequency to search for any broadcasting mobile radio cells. A detected mobile radio cell on this carrier frequency may then be associated with the carrier frequency by mobile radio cell detection circuit 410.

Cell detection circuit 410 may therefore receive digitized, baseband versions of wirelessly transmitted signals $420_1$-$420_n$ from RF transceiver 404. Due to the cyclical nature of a mobile radio cell search and measurement process, mobile radio cell detection circuit 410 may receive only one such signal at a time, although parallel implementations are also possible. In an exemplary scenario, wireless signal $420_3$ may have been transmitted by mobile radio cell number 349, as detailed in mobile radio cell information block 430. Cell detection circuit 410 may process the digital signal provided RF transceiver 404 to extract any contained cellular identification information. Cell detection circuit 410 may also determine that mobile radio cell 349 is using the PSS vector identified by (r=1), and is transmitting over carrier channel centered at 1800 MHz. Cell detection circuit 410 may determine similar information regarding the respective transmitting mobile radio cells for the remaining wireless signals $420_1$-$420_n$ received by UE 400.

Cell detection circuit 410 may also be configured to determine a reliability metric for each detected mobile radio cell. As opposed to the first conventional method as described above, mobile radio cell detection circuit 410 may only dedicate a relatively short period of time to calculate each reliability metric. For example, mobile radio cell detection circuit 410 may perform a signal-power based measurement of a received synchronization sequence, such as the received PSS and/or SSS signal power (RPSSP/RSSSP or RSSP). Cell detection circuit 410 may alternatively calculate one of an SNR estimate of a received PSS or SSS, an SNR estimate of the channel estimates obtained from a received PSS or SSS, or an SNR estimate of a timing/frequency estimate. Cell detection circuit 410 may then determine a reliability metric based on one or more of the above values. The reliability metric represents the reliability of a measured mobile radio cell, i.e. is a quantitative value indicating the quality of wireless communications between a given transmitting mobile radio cell and a UE such as UE 400.

The reliability metric may also be obtained from signal-power based measurements of the cell specific reference signal (CRS). For example, mobile radio cell detection circuit 410 may calculate one or more of a received CRS signal power (RSSI), an SNR estimate of a CRS, an SNR estimate of the channel estimates obtained from a CRS, or an SNR estimate of CRS-based timing/frequency estimates. Cell detection circuit 410 may then determine a reliability metric based on one or more of these measured values.

As shown in FIG. 4, mobile radio cell detection circuit 410 may receive a control signal from mobile radio cell search controller 408. Cell search controller 408 may specify which of the above measurements mobile radio cell detection circuit 410 should perform. Additionally, mobile radio cell search controller 408 may define how the reliability metric is determined. For example, mobile radio cell search controller 408 may provide mobile radio cell detection circuit 410 with a set of specific measurements to perform in order to obtain a reliability metric.

Cell search controller 408 may also define the processing operations of mobile radio cell detection circuit 410. For example, mobile radio cell search controller 408 may specify a number of frames that mobile radio cell detection circuit 410 should dedicate to processing each signal. For example, mobile radio cell search controller 408 may dictate that mobile radio cell detection circuit should perform an SNR estimate using e.g. one or two half frames of data. Cell search controller 408 may also in effect define the periodicity of mobile radio cell search cycling. For example, mobile radio cell search controller 408 may instruct mobile radio cell detection circuit 408 to utilize two half frames of data to calculate each reliability metric. Cell detection circuit 408 may then process a new mobile radio cell every two half frames, thereby cycling through a large number of mobile radio cells in a short period of time. RF transceiver 404 may also receive a control signal from mobile radio cell search controller 408 (not shown in FIG. 4) in order to synchronize carrier frequency selection with periodic cycling through mobile radio cells. In other words, mobile radio cell search controller 408 may instruct RF transceiver 404 to receive wireless signals on a different carrier frequency in order to identify any mobile radio cells transmitting over that carrier frequency.

Cell detection circuit 410 may provide the obtained mobile radio cell identifier, timing/frequency information, and/or reliability metric to decision filter 412. Decision filter 412 may utilize the received information to determine whether further analysis of a given mobile radio cell is desired. Decision filter 412 may select mobile radio cells for further analysis based on the satisfaction of a predefined criterion. In an exemplary scenario, mobile radio cell detection circuit 410 may process wireless signal 420$_3$ to determine that it was transmitted by mobile radio cell number 349. Additionally, mobile radio cell detection circuit 410 may calculate a reliability metric of s=0.9 for mobile radio cell number 349, where s may range from 0.0 to 1.0. Accordingly, a reliability metric of s=0.9 may indicate a very high reliability for mobile radio cell 349. These values and ranges for s are exemplary, and numerous other ranges and values could be utilized. Decision filter 412 may then determine whether further analysis of a mobile radio cell is desired based on the provided reliability metric. For example, decision filter 412 may be configured to select mobile radio cells that provide a reliability metric s>0.4 for further processing. Accordingly, decision filter 412 may use a threshold to select cells for further analysis. Decision filter 412 may provide selected mobile radio cells to mobile radio cell evaluation circuit 414, which may be configured to perform further processing on a given mobile radio cell.

Various parameters may be used by decision filter 412 in order to select suitable mobile radio cells for further processing. For example, any number of possible thresholds for calculated reliability metrics may be used. Additionally, the threshold may be adaptive, i.e. may change based on current or past network conditions. The threshold may be provided to decision filter 412 by cell search controller 408, which may be coupled to decision filter 412 as shown in FIG. 4. Additionally, mobile radio cell search controller 408 may define other parameters such as e.g. the filter length for decision filter 412.

As shown in FIG. 4, decision filter 412 may be coupled to mobile radio cell evaluation circuit 414. Decision filter 412 may accordingly provide mobile radio cell evaluation circuit 414 with mobile radio cell information (e.g. cell identifier, timing/frequency information, reliability metric, etc.) for mobile radio selected cells. For example, decision filter 412 may provide mobile radio cell evaluation circuit 414 with mobile radio cell information for mobile radio cells that satisfied a predefined criterion, i.e. produced a reliability metric satisfying a threshold. Cell evaluation circuit 414 may subsequently perform further processing of selected mobile radio cells. For example, mobile radio cell evaluation circuit 414 may perform an RSRP or RSRQ measurement of selected mobile radio cells in order to obtain a comprehensive representation of the reliability of a mobile radio cell. Accordingly, the analysis performed by mobile radio cell evaluation circuit 414 may be longer in duration than the analysis performed by mobile radio cell detection circuit 410. The analysis performed by mobile radio cell evaluation circuit 414 may be similar to the analysis performed by the first conventional mobile radio cell detection method as described above. However, the analysis by mobile radio cell evaluation circuit 414 may only be performed for mobile radio cells that satisfy a predefined criterion, e.g. a threshold as used by decision filter 412. Therefore, mobile radio cells that produce an initially low reliability metric are not analyzed by mobile radio cell evaluation circuit 414, which may save power and reduce processing requirements.

As shown in FIG. 4, RF transceiver 404 may also provide a received digitized signal to mobile radio cell evaluation circuit 414. Cell evaluation circuit 414 may perform further analysis of selected mobile radio cells using a digitized signal received from RF transceiver 404. Cell evaluation circuit 414 may accordingly perform RSRP or RSRQ measurement for mobile radio cells selected by decision filter 412 for further processing. For example, mobile radio cell evaluation circuit 414 may perform another mobile radio cell search based on the selected mobile radio cells from decision filter 412. A list of detected nearby mobile radio cells may accordingly be maintained based on the results of the processing performed by cell evaluation circuit 414.

A mobile communication device such as UE 102 may therefore include a receiver (RF transceiver 404) configured to receive one or more wireless signals from one or more mobile radio cells. UE 102 may also include a first circuit (cell detection circuit 410) configured to determine a reliability metric for each mobile radio cell based on a signal level measurement of one of the wireless signals. UE 102 may further include a second circuit (cell evaluation circuit 414) configured to perform a mobile radio cell search only for mobile radio cells having a reliability metric that satisfies a predefined criterion.

Cell evaluation circuit 414 may be configured to update a list of valid candidate mobile radio cells based on the results of the mobile radio cell search.

Cell detection circuit 410 may perform a signal power measurement as the signal level measurement, and accordingly the predefined criterion may be a signal power threshold.

Cell evaluation circuit 414 may perform a signal power measurement or signal quality measurement as part of the mobile radio cell search. The signal level measurement performed by cell detection circuit 410 may be completed in a shorter time period than the signal power or signal quality measurement performed by cell evaluation circuit 414.

Cell detection circuit 410 may determine the reliability metrics for the one or more cells based on a measurement of a synchronization sequence contained in one of the received wireless signals. Alternatively, cell detection circuit 410 may determine the reliability metrics for the one or more cells based on a cell specific reference signal.

Cell evaluation circuit 414 may perform an RSRP or RSRQ measurement as part of the mobile radio cell search.

UE 102 may process the wirelessly received signals in accordance with a UMTS network. Alternatively, UE 102 may process the wirelessly received signals in accordance with an LTE or LTE-A network.

Figure 5:
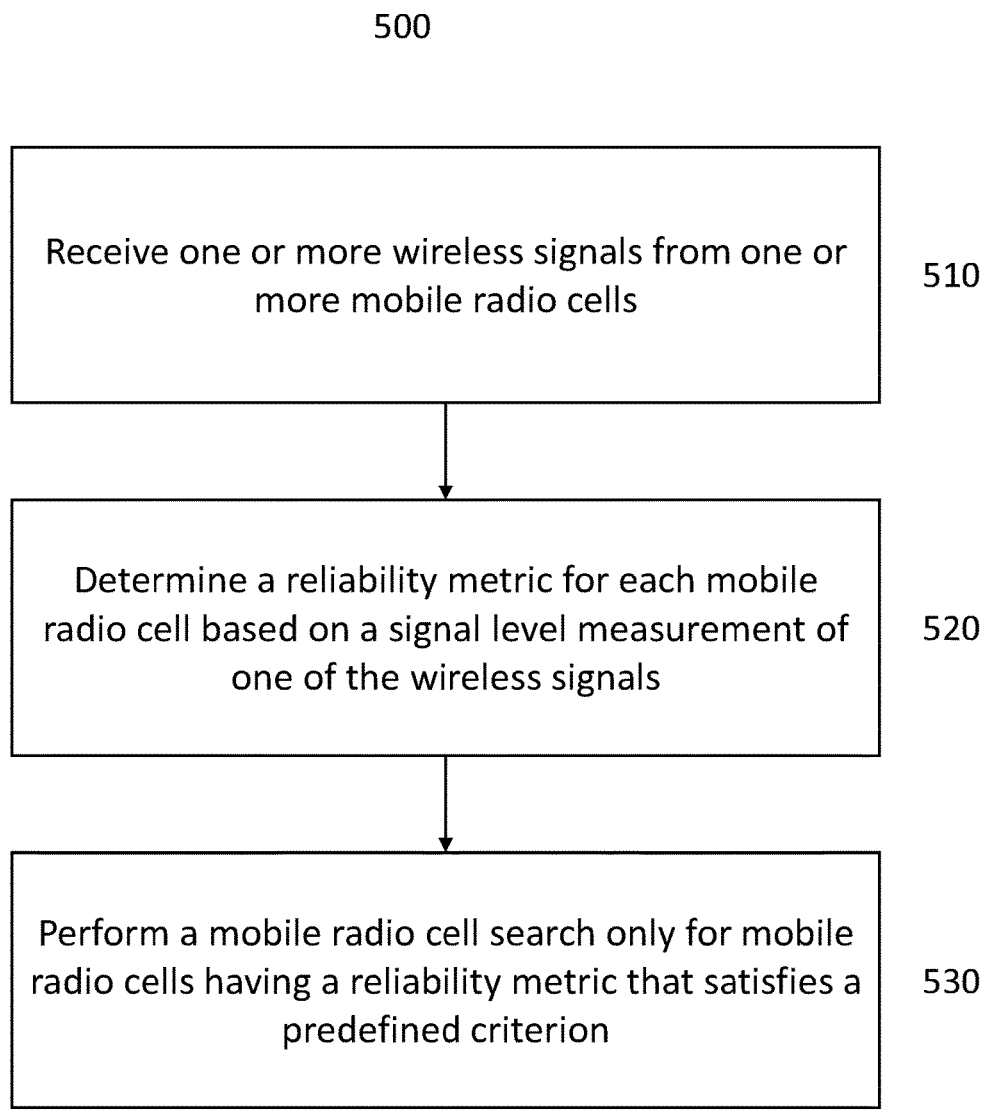
FIG. 5 shows a flow diagram illustrating a mobile radio cell search process.

FIG. 5 shows a flow diagram 500 illustrating a method for performing a mobile radio cell search.

Method 500 may include receiving one or more wireless signals from one or more mobile radio cells 510. Method 500 may also include determining each reliability metric based on a signal level measurement of one of the wireless signals 520. Method 500 may further include performing a mobile radio cell search only for mobile radio cells having a reliability metric that satisfies a predefined criterion 530.

Method 500 may further include updating a list of valid candidate mobile radio cells based on the results of the partial mobile radio cell search.

The signal level measurement performed of 520 may be a signal power measurement, and the predefined criterion of 530 may accordingly be a signal power threshold.

530 may perform a signal power measurement or signal quality measurement as part of the mobile radio cell search. The signal level measurement of 520 may be completed in a shorter time period than the signal power or signal quality measurement of 530.

520 may determine each reliability metric based on a measurement of a synchronization sequence contained in one of the received wireless signals or a cell specific reference signal.

530 may perform an RSRP or RSRQ measurement as part of the mobile radio cell search.

Method 500 may process the received wireless signals in accordance with a UMTS network. Alternatively, method 500 may process the received wireless signals in accordance with an LTE or LTE-A network.

As previously detailed, UE 102 may be additionally configured to consider detection occurrence counts for each mobile radio cell as part of a mobile radio cell search detection process.

Cell detection circuit 410 may accordingly be configured to determine a reliability metric and a mobile radio cell detection occurrence count for each mobile radio cell based on the one or more received wireless signals as part of a first partial mobile radio cell search. Cell evaluation circuit 414 may perform a second partial mobile radio cell search only for mobile radio cells having a reliability metric or mobile radio cell detection occurrence count that satisfies a predefined criterion.

Cell evaluation circuit 414 may update a list of valid candidate mobile radio cells based on the results of the second partial mobile radio cell search.

Cell detection circuit 410 may determine one or more of the reliability metrics using a signal power measurement.

UE 102 may additionally comprise a third circuit (decision filter 412) configured to select mobile radio cells having a reliability metric or mobile radio cell detection occurrence count that satisfies a predefined criterion. Cell evaluation circuit 414 may accordingly be configured to perform a partial mobile radio cell search on the cells selected by decision filter 412.

Cell detection circuit 410 may determine one or more of the reliability metrics using a signal power measurement. Decision filter 412 may use a predefined criterion such as a signal power threshold or a number of past mobile radio cell detection occurrences in order to select mobile radio cells for cell evaluation circuit 414 to further process.

Accordingly, cell evaluation circuit 414 may perform the partial mobile radio cell search only for mobile radio cells having a signal power measurement that satisfies a predefined threshold or for mobile radio cells that have been detected at least one previous time.

Cell evaluation circuit 414 may also perform a signal power or signal quality measurement as part of the partial mobile radio cell search. The signal level measurement performed by cell detection circuit 410 may be completed in a shorter time period than the signal power measurement or signal quality measurement performed by cell evaluation circuit 414.

Cell detection circuit 410 may determine each reliability metric based on a measurement of a synchronization sequence contained in one of the received wireless signals or a cell specific reference signal.

Decision filter 412 may be configured to increment a mobile radio cell detection occurrence count for a mobile radio cell each time a wireless signal is received from the mobile radio cell.

Decision filter 412 may be configured to discard the mobile radio cell detection occurrence count for a mobile radio cell if a predefined amount of time has passed since the last reception of a wireless signal from the mobile radio cell.

Cell evaluation circuit 414 may perform an RSRP or RSRQ measurement as part of the partial mobile radio cell search.

UE 102 may process the wirelessly received signals in accordance with a UMTS network. Alternatively, UE 102 may process the wirelessly received signals in accordance with an LTE or LTE-A network.

Figure 6:
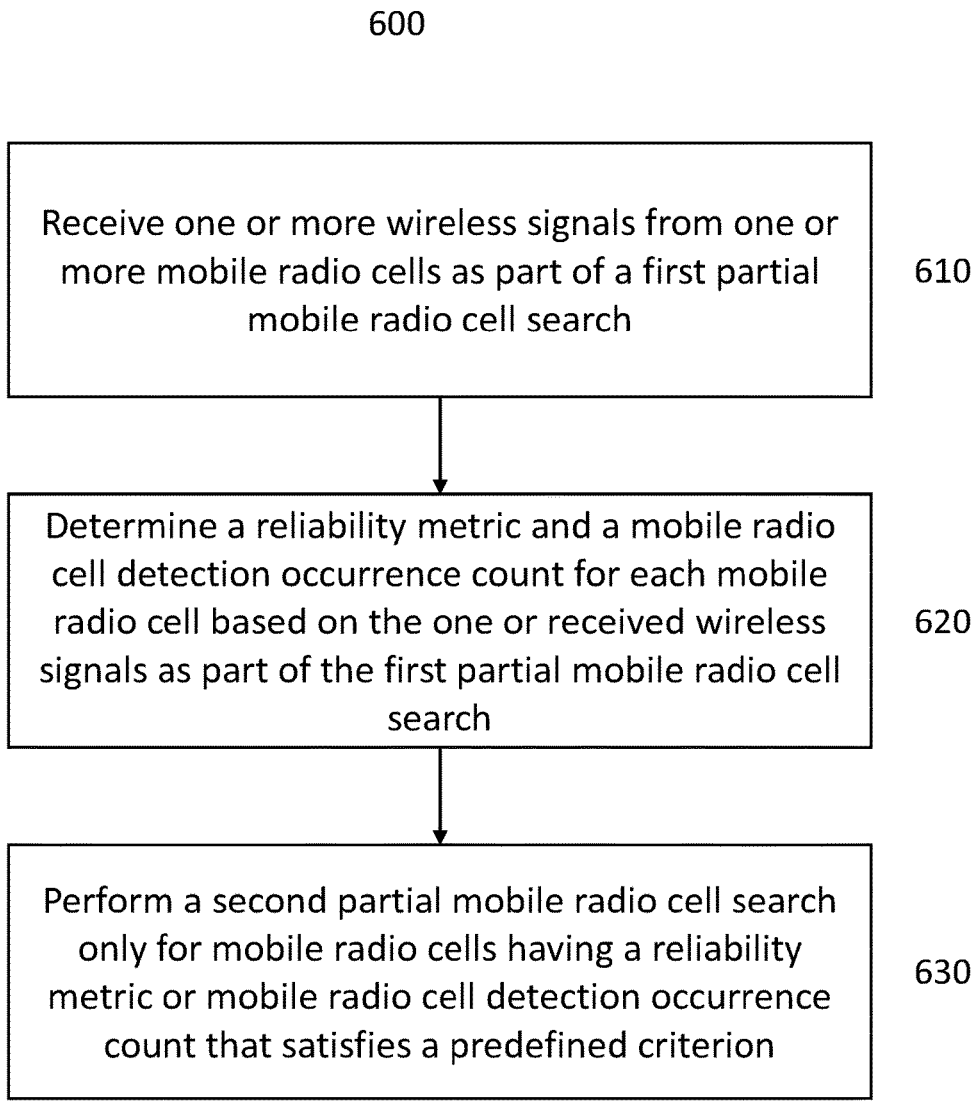
FIG. 6 shows a flow diagram illustrating a mobile radio cell search process.

FIG. 6 shows a flow diagram 600 illustrating a method for performing a mobile radio cell search. Method 600 may utilize both reliability metrics and mobile radio cell detection occurrence counts for performing the mobile radio cell search.

Method 600 may include receiving one or more wireless signals from one or more mobile radio cells as part of a first partial mobile radio cell search 610. Method 600 may include determining a reliability metric and a mobile radio cell detection occurrence count for each mobile radio cell based on the one or more received wireless signals as part of the first partial mobile radio cell search 620. Method 600 may further include performing a second partial mobile radio cell search only for mobile radio cells having a reliability metric or mobile radio cell detection occurrence that satisfies a predefined criterion 630.

Method 600 may further include updating a list of valid candidate mobile radio cells based on the results of the second partial mobile radio cell search.

One or more of the reliability metrics in 620 may be a signal power measurement.

630 may use a signal power threshold or a number of past detection occurrences as the predefined criterion. Accordingly, 630 may perform the second partial mobile radio cell search only for mobile radio cells having a signal power measurement that satisfies a predefined threshold or for mobile radio cells that have been detected at least one previous time.

630 may perform a signal power or signal quality measurement as part of the second partial mobile radio cell search. The signal level measurement of 620 may be completed in a shorter time period than the signal power or signal quality measurement of 630.

620 may determine one or more of the reliability metrics based on the measurement of a synchronization sequence contained in one of the received wireless signals or a cell specific reference signal.

Method 600 may further include incrementing a mobile radio cell detection occurrence count for a mobile radio cell each time a wireless signal is received from the mobile radio cell.

Method 600 may additionally include discarding the mobile radio cell detection occurrence count for a mobile radio cell if a predefined amount of time has passed since the last reception of a wireless signal from the mobile radio cell.

630 may perform a reference signal receive power or reference signal receive quality measurement as part of the second partial mobile radio cell search.

Method 600 may include processing the received wireless signals in accordance with a UMTS network. Alternatively, method 600 may process the received wireless signals in accordance with an LTE or LTE-A network.

Figure 7:
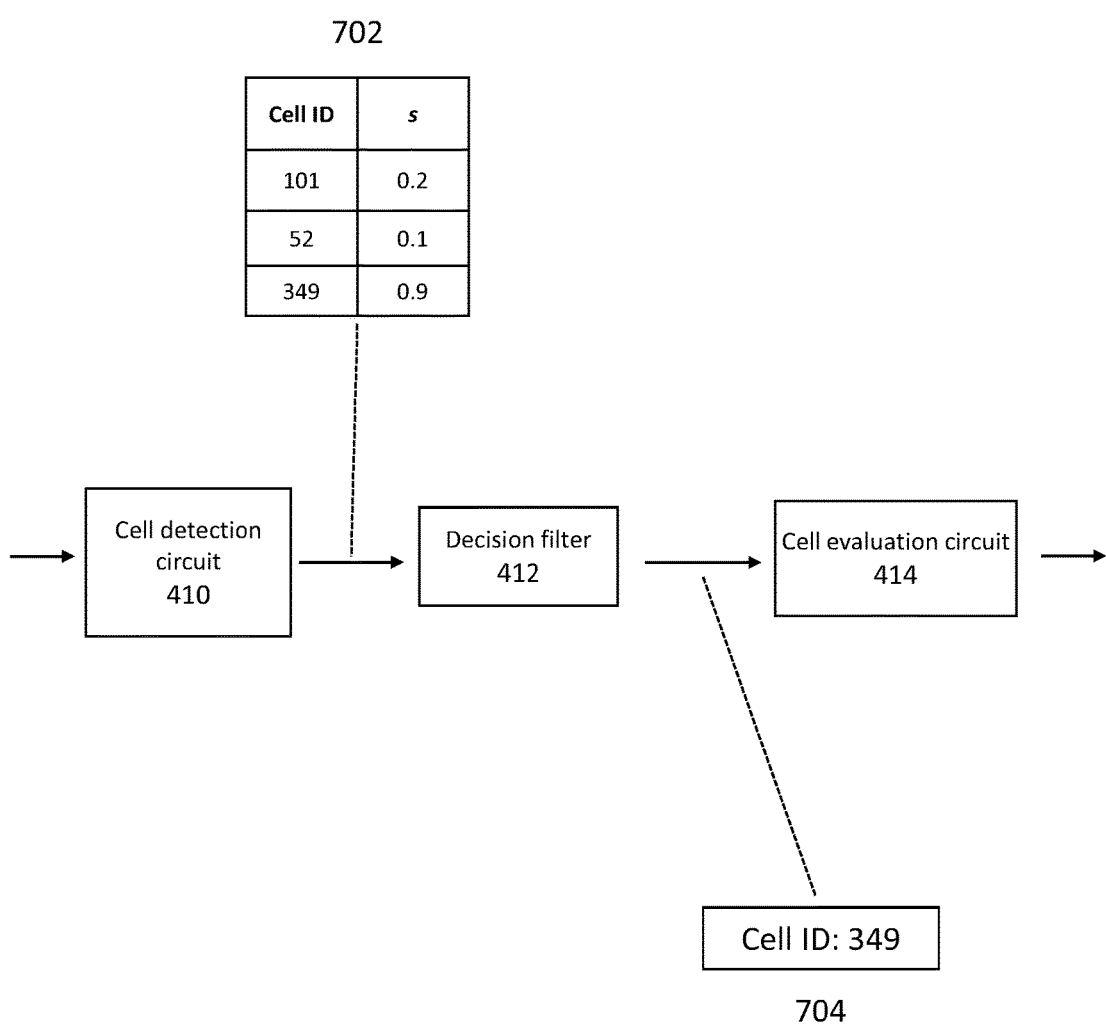
FIG. 7 shows an exemplary operation of decision circuitry.

FIG. 7 details an exemplary process as performed by decision filter 412. Cell detection circuit 410 may determine the mobile radio cell IDs associated with multiple received wireless signals such as 420$_1$-420$_3$ as shown in FIG. 4 along with timing/frequency information and a reliability metric for each mobile radio cell. Cell detection circuit 410 may provide detected mobile radio cell information 702 to decision filter 412. Cell 101 may have transmitted wireless signal $420_1$ as detailed in FIG. 4, while mobile radio cell 52 may have transmitted wireless signal $420_2$. As previously detailed, mobile radio cell 324 may have transmitted wireless signal $420_3$. Mobile radio cells 349, 52, and 101 may be e.g. LTE mobile radio cells. Decision filter may then select only mobile radio cells provided by mobile radio cell detection circuit 410 that satisfy a predefined criterion, such as exceeding a threshold value. The calculated reliability metrics may be bounded from [0.0, 1.0], although any range of values is possible. Decision filter 412 may utilize a threshold to select detected mobile radio cells for further processing by mobile radio cell evaluation circuit 414. For example, decision filter 412 may use a threshold of e.g. 0.5. Accordingly, decision filter 412 may analyze detected mobile radio cell information 702 to determine the mobile radio cells that produced a reliability metric exceeding the predefined threshold. As shown in FIG. 7, mobile radio cells 349 and 52 may produce reliability metrics s=0.2 and s=0.1, respectively, which fall below the threshold. Accordingly, these mobile radio cells may not be selected for further processing. Cell 349, however, may produce a reliability metric of s=0.9. Decision filter 412 may select mobile radio cell 349 for further processing based on this calculated reliability metric. Decision filter 412 accordingly may provide selected mobile radio cell information 704 including mobile radio cell 349 to mobile radio cell evaluation circuit 414 in order to obtain a comprehensive analysis of mobile radio cell 349 for maintaining an accurate list of valid detected mobile radio cells.

Decision filter 414 may use additional criteria to select mobile radio cells for further processing by mobile radio cell evaluation circuit 414. For example, decision filter 414 may store mobile radio cell IDs provided by mobile radio cell detection circuit 410 in a buffer or memory. Decision filter 412 may then select a mobile radio cell for further processing if it has been detected multiple times. For example, decision filter 412 may select a mobile radio cell for further processing if it has been previously detected, regardless of any associated reliability metric. In another exemplary aspect of the disclosure, decision filter 412 may take into account both a calculated reliability metric and detection occurrence count for a mobile radio cell. In this exemplary aspect, decision filter 412 may select mobile radio cells for further processing that have been detected multiple times in addition to having a reliability metric above a second threshold. This second threshold may be lower than the first threshold reliability metric threshold.

Figure 8:
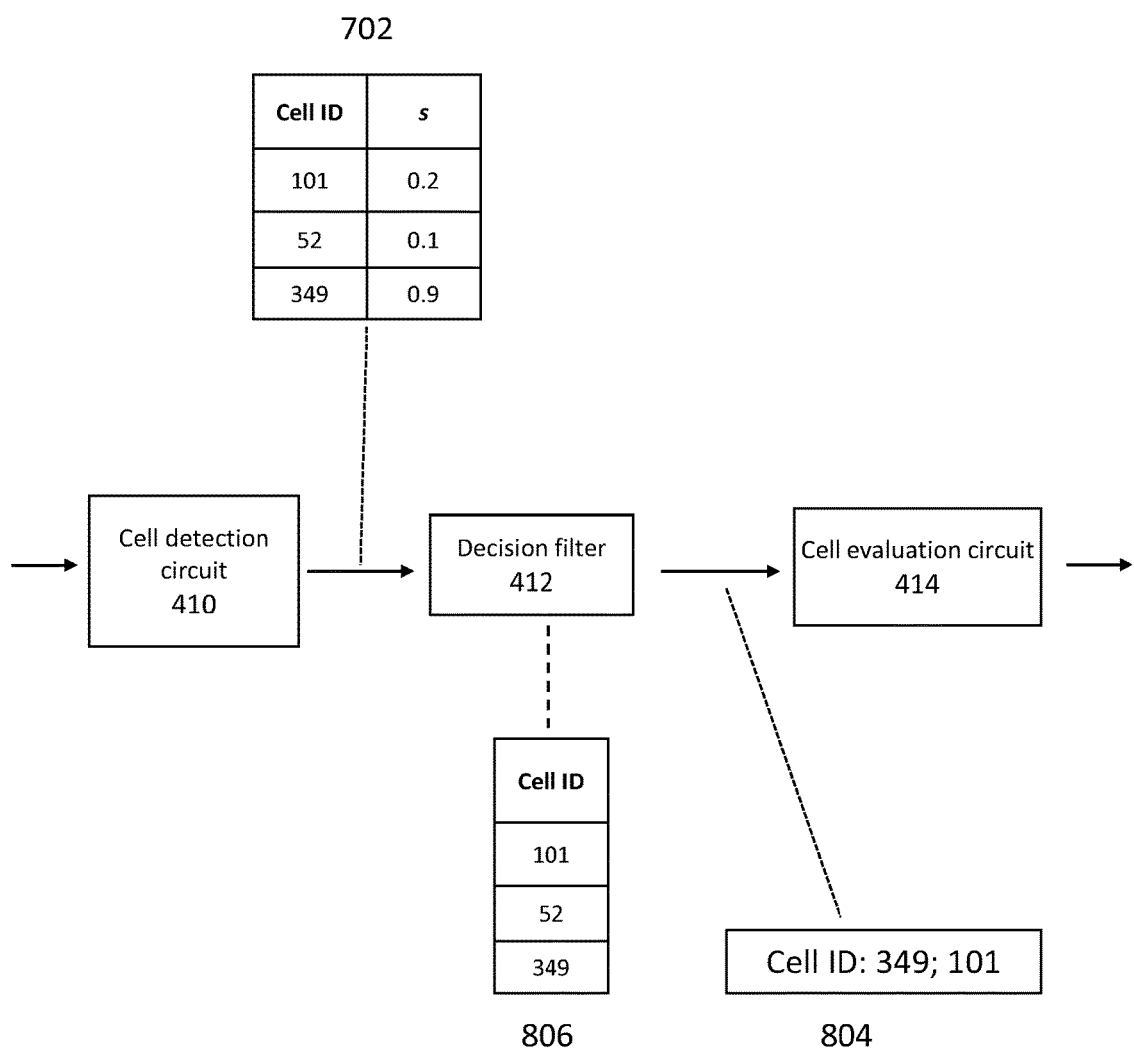
FIG. 8 shows an exemplary operation of decision circuitry.

FIG. 8 shows an exemplary aspect of the disclosure that uses detection occurrence as an additional criteria for mobile radio cell selection by decision filter 412. Similarly to FIG. 7, decision filter 412 may receive the same detected mobile radio cell information 702 from cell detection circuit 410. Decision filter 412 may use the same threshold, i.e. 0.5, to select mobile radio cells for further processing. Accordingly, only mobile radio cell 349 produces a reliability metric (s=0.9) that satisfies this threshold. However, decision filter 412 may also refer to mobile radio cell detection history 806 to determine whether any of the cells supplied in detected mobile radio cell information 502 have been previously detected. Cell detection history 806 may be stored in a memory or buffer, e.g. in memory 406 or another dedicated memory. As shown in FIG. 8, cell 101 is present in mobile radio cell detection history 806, meaning that mobile radio cell 101 has been previously detected, i.e. has been previously identified by mobile radio cell detection circuit 410 from a received wireless signal and supplied to decision filter 412. Multiple detections of mobile radio cell 101 may indicate a possibility that it is a valid nearby mobile radio cell. Accordingly, decision filter 412 may also select mobile radio cell 101 for further processing by mobile radio cell evaluation circuit 414. As shown in FIG. 8, selected mobile radio cell information 804 including mobile radio cells 349 and 101 may be provided to mobile radio cell evaluation circuit 414 for further processing. As previously detailed, decision filter may provide a mobile radio cell identifier in addition to timing/frequency information or a reliability metric to mobile radio cell evaluation circuit 414.

Cell search controller 408 may similarly define the parameters used by decision filter 412 for selection of detected mobile radio cells based on detection occurrence. Cell search controller 408 may specify that a mobile radio cell is required to be detected a certain number of times before it may be selected by decision filter 412 for processing. For example, mobile radio cell search controller 408 may specify that a given mobile radio cell must be detected e.g. three times before it may be selected for future processing. Accordingly, mobile radio cell detection history 806 may additionally include a detection occurrence count along with each previously detected mobile radio cell, and increment the counter for a given mobile radio cell each time it is provided to decision filter 412. Decision filter 412 may then cross-check each mobile radio cell provided in detected mobile radio cell information 702 with the mobile radio cells in mobile radio cell detection history 806 to determine how many times a given mobile radio cell has been detected before selecting a mobile radio cell for further processing.

Cell detection history 806 may additionally have a finite memory. For example, mobile radio cells in mobile radio cell detection history 806 may be deleted or discarded after a certain amount of time. Consequently, a mobile radio cell for which a long period of time has passed since the last detection may be discarded from mobile radio cell detection history 806, as it may indicate a false alarming mobile radio cell.

Accordingly, only mobile radio cells that either produce a satisfactory reliability metric or a high detection occurrence count may be selected for future processing for mobile radio cell evaluation circuit 414. Cell evaluation circuit 414 may then perform a mobile radio cell search including RSRP or RSRQ measurement on selected mobile radio cells in order to obtain a complete evaluation of detected mobile radio cells. The processing results of mobile radio cell evaluation circuit 414 may be used to maintain and periodically update a list of valid nearby detected mobile radio cells. This list of valid detected mobile radio cells may be stored in a memory such as e.g. memory 406. This list may be referred to for handover or carrier aggregation processes as implemented by the network.

Cell evaluation circuit 414 therefore performs an extensive analysis only on mobile radio cells that pass the pre-selection stage implemented by decision filter 412. Processing requirements may be reduced, as fewer RSRP or RSRQ measurements are performed for mobile radio cells with low reliability. Additionally, the reduction of dedicated RSRP or RSRQ calculations yields greater scheduling flexibility as the mobile radio cell search may cycle through potential mobile radio cells in short bursts. The implementation of mobile radio cell detection history 806 also serves to reduce average mobile radio cell detection time, as newly detected strong cells may be measured immediately as opposed to waiting for future detection occurrences.

Figure 9:
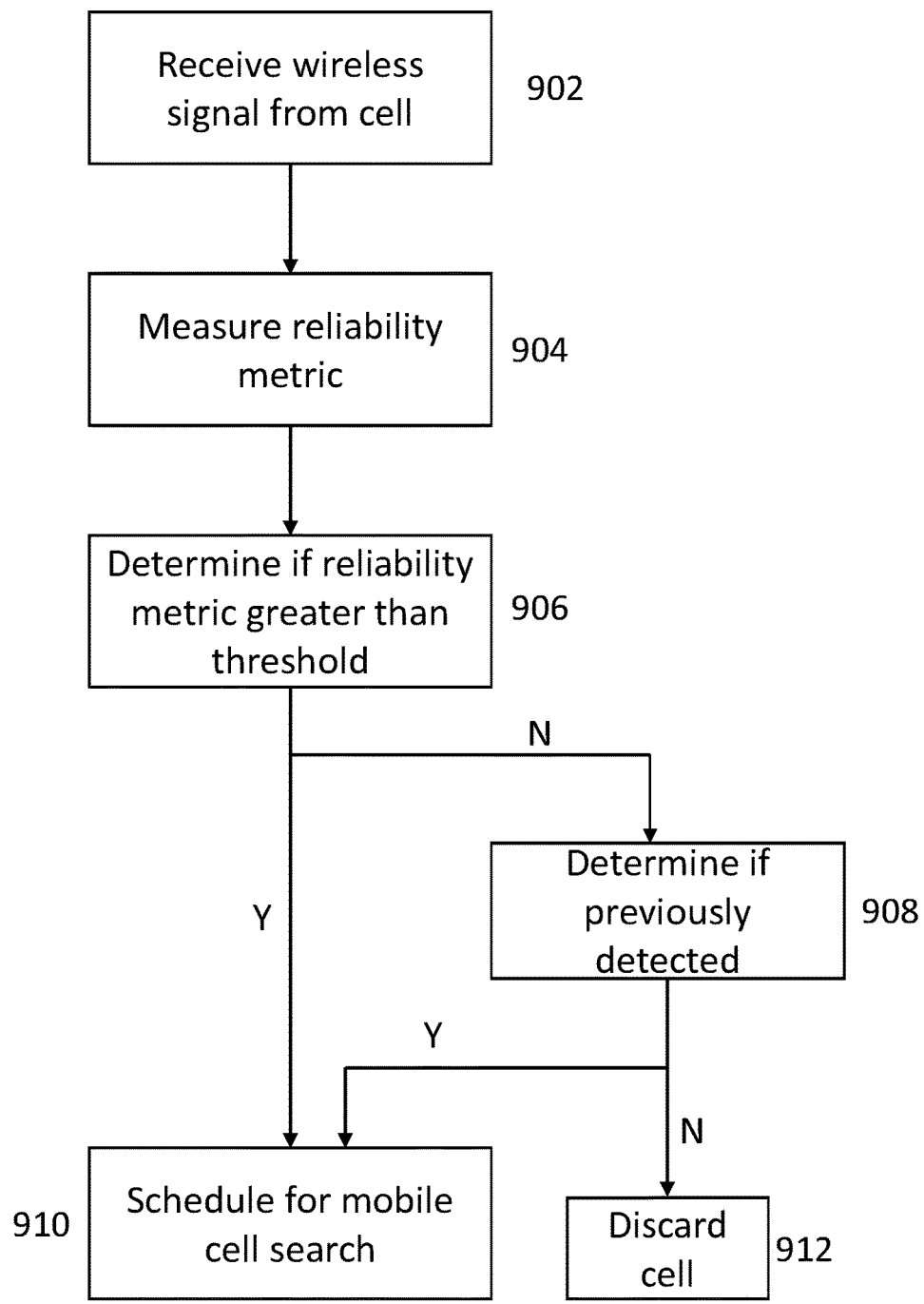
FIG. 9 shows a flow diagram illustrating a mobile radio cell search process.

FIG. 9 shows a flow chart illustrating an exemplary process 900 according to the disclosure.

Process 900 may include receiving a wireless signal from a mobile radio cell 902. 904 may include measuring a reliability metric using the received wireless signal. 906 may determine this reliability metric using a signal power measurement, and may additionally identify the transmitting mobile radio cell using the received wireless signal. Method 900 may also include determining if the reliability metric is greater than a threshold 906. This threshold may be predefined, and may be used to identify only mobile radio cells that exhibit a high level of reliability based on the calculated reliability metrics. 910 may schedule for a mobile radio cell search 910 for mobile cells that have a reliability metric that satisfies the predefined threshold. Alternatively, 908 may determine if mobile radio cells that do not have an acceptable reliability metric have been previously detected. 910 may also schedule mobile radio cell searches for mobile radio cells that have been previously detected but did not have a reliability metric satisfying the threshold of 906. 912 may discard mobile radio cells that have a reliability metric lower than the threshold and have not been previously detected.

Numerous variations of the methods and devices described above are possible. For example, detection occurrence may be used as the first line of filtering for detected cells, such as e.g. cells that are identified by cell detection circuit 410 in FIG. 8. In this exemplary aspect of the disclosure, mobile radio cell detection circuit 410 may contain or be coupled to a component such as mobile radio cell detection history 806. After identifying a mobile radio cell from a wirelessly transmitted signal, mobile radio cell detection circuit 410 may refer to mobile radio cell detection history 806 before determining a reliability metric. Cell detection circuit 410 may automatically forward any mobile radio cells that have been previously detected to mobile radio cell evaluation circuit 414, thereby measurement of a reliability metric and decision filter 412. This modification may further reduce processing requirements, as mobile radio cell detection circuit 410 may not perform reliability metric calculations for mobile radio cells that have been previously detected. Instead, mobile radio cells that have been previously detected are directly forwarded to mobile radio cell evaluation circuit 414 for an RSRP or RSRQ measurement.

In another exemplary aspect of the disclosure, mobile radio cell evaluation circuit 414 may determine the scheduling of RSRP or RSRQ measurements for selected mobile radio cells based on determined reliability metrics and/or detection occurrence count. For example, several mobile radio cells may have been identified by decision filter 412 for further analysis by mobile radio cell evaluation circuit 414, and accordingly may be waiting in a mobile radio cell measurement queue. Cell evaluation circuit 414 may periodically re-organize the mobile radio cell measurement queue based on the reliability metrics of the contained mobile radio cells. For example, mobile radio cell evaluation circuit 414 may organize the mobile radio cell measurement queue from highest to lowest by reliability metric every time a new mobile radio cell is added to the mobile radio cell measurement queue. In this manner, mobile radio cells having the highest reliability metric may be measured first by mobile radio cell evaluation circuit 414.

The reliability metrics may also be calculated or utilized in any number of ways. For example, the reliability metrics may be the direct result of a signal power measurement of a received wireless signal, i.e. each reliability metric may be a signal power measurement. Alternatively, the reliability metrics may be calculated from the result of a signal power measurement. In other words, a signal power measurement value may first be obtained from a received wireless signal. A reliability metric may then be obtained from the signal power measurement value, such as e.g. by scaling, normalizing, or weighting the signal power measurement.

Alternatively, one or more of the reliability metrics may be calculated using multiple measurement values. For example, multiple measurement values may be obtained for the same wireless signal using synchronization sequence or CRS measurements. A reliability metric may be obtained by combining the various obtained measurements, such as e.g. by weighting.

Multiple reliability metrics may also be obtained for each wireless signal. For example, both a synchronization sequence-based measurement and a CRS-based measurement may be obtained for the same wireless signal. Decision circuitry such as decision filter 412 may compare both the synchronization sequence-based measurement and the CRS-based measurement to one or more thresholds, e.g. comparing the synchronization sequence-based measurement to a first threshold and the CRS-based measurement to a second threshold. Decision filter 412 may then select the associated mobile radio cell based on the reliability metrics satisfying none, one of, or both thresholds. For example, decision filter 412 may select the associated mobile radio cell if one of the reliability metrics satisfies one of the respective thresholds. Alternatively, decision filter 412 may select the associated mobile radio cell only if both reliability metrics satisfy their respective thresholds.

In a further exemplary aspect of the disclosure, the reliability metrics may be dependent on a previously calculated reliability metric. For example, a reliability metric for a given cell may be calculated using a weighted version of a previously calculated reliability metric for the given cell.

The following examples pertain to further aspects of this disclosure:

Example 1 is a method for performing a mobile radio cell search. The method includes performing a first partial mobile radio cell search, where the first partial mobile radio cell search includes: receiving one or more wireless signals from one or more mobile radio cells; and determining a reliability metric and a mobile radio cell detection occurrence count for each of the one or more mobile radio cells based on the one or more received wireless signals. The method further includes performing a second partial mobile radio cell search for one or more mobile radio cells having a reliability metric or mobile radio cell detection occurrence count that satisfies a predefined criterion.

In Example 2, the subject matter of Example 1 can optionally further include updating a list of valid candidate mobile radio cells based on a result of the second partial mobile radio cell search.

In Example 3, the subject matter of Example 1 or 2 can optionally include wherein at least one of the reliability metrics is a signal power measurement.

In Example 4, the subject matter of Example 3 can optionally include wherein the predefined criterion is a signal power threshold or a number of past mobile radio cell detection occurrences.

In Example 5, the subject matter of Example 4 can optionally include wherein a second partial mobile radio cell search is performed for one or more mobile radio cells having a signal power measurement that satisfies a predefined threshold or for one or more mobile radio cells that have been previously detected at least one time.

In Example 6, the subject matter of Examples 3 to 5 can optionally include wherein the second partial mobile radio cell search includes a signal power or signal quality measurement, and wherein the signal power measurement of the first partial mobile radio cell search is completed in a shorter time period than the signal power or signal quality measurement of the second partial mobile radio cell search.

In Example 7, the subject matter of Examples 1 to 6 can optionally include wherein each reliability metric is determined based on a measurement of a synchronization sequence contained in one of the received wireless signals or a cell specific reference signal.

In Example 8, the subject matter of Examples 1 to 7 can optionally include further including incrementing a mobile radio cell detection occurrence count for a mobile radio cell each time a wireless signal is received from the mobile radio cell.

In Example 9, the subject matter of Example 8 can optionally further include discarding the mobile radio cell detection occurrence count for a mobile radio cell if a predefined amount of time has passed since the last reception of a wireless signal from the mobile radio cell.

In Example 10, the subject matter of Examples 1 to 9 can optionally include wherein the second partial mobile radio cell search includes a reference signal receive power (RSRP) or reference signal receive quality (RSRQ) measurement.

In Example 11, the subject matter of Examples 1 to 10 can optionally include wherein the received wireless signals are processed in accordance with a Universal Mobile Telecommunications System (UMTS) network.

In Example 12, the subject matter of Examples 1 to 10 can optionally include wherein the received wireless signals are processed in accordance with a Long Term Evolution (LTE) network.

In Example 13, the subject matter of Examples 1 to 10 can optionally include wherein the received wireless signals are processed in accordance with a Long Term Evolution Advanced (LTE-A) network.

Example 14 is a mobile radio communication terminal device. The mobile radio communication terminal device includes a receiver configured to receive one or more wireless signals from one or more mobile radio cells; a first circuit configured to determine a reliability metric and a mobile radio cell detection occurrence count for each of the one or more mobile radio cells based on the one or more received wireless signals; and a second circuit configured to perform a partial mobile radio cell search for one or more mobile radio cells having a reliability metric or mobile radio cell detection occurrence count that satisfies a predefined criterion.

In Example 15, the subject matter of Example 14 can optionally include wherein the second circuit is further configured to update a list of valid candidate mobile radio cells based on a result of the partial mobile radio cell search.

In Example 16, the subject matter of Example 14 or 15 can optionally include a third circuit configured to select one or more mobile radio cells having a reliability metric or mobile radio cell detection occurrence count that satisfies a predefined criterion, and wherein the second circuit is configured to perform a partial mobile radio cell search on the cells selected by the third circuit.

In Example 17, the subject matter of Examples 14 to 16 can optionally include wherein at least one of the reliability metrics determined by the first circuit is a signal power measurement.

In Example 18, the subject matter of Example 17 can optionally include wherein the predefined criterion is a signal power threshold or a number of past mobile radio cell detection occurrences.

In Example 19, the subject matter of Example 18 can optionally include wherein the second circuit is configured to perform the partial mobile radio cell search for one or more mobile radio cells having a signal power measurement that satisfies a predefined threshold or for one or more mobile radio cells that have been previously detected at least one time.

In Example 20, the subject matter of Examples 17 to 19 can optionally include wherein the partial mobile radio cell search includes a signal power or signal quality measurement, and wherein the signal power measurement performed by the first circuit is completed in a shorter time period than the signal power or signal quality measurement of the partial mobile radio cell search.

In Example 21, the subject matter of Examples 14 to 20 can optionally include wherein each reliability metric is determined based on a measurement of a synchronization sequence contained in one of the received wireless signals or a cell specific reference signal.

In Example 22, the subject matter of Examples 14 to 21 can optionally include a third circuit configured to increment the mobile radio cell detection occurrence count for a mobile radio cell each time a wireless signal is received from the mobile radio cell.

In Example 23, the subject matter of Example 22 can optionally include wherein the third circuit is configured to discard the mobile radio cell detection occurrence count for a mobile radio cell if a predefined amount of time has passed since the last reception of a wireless signal from the mobile radio cell.

In Example 24, the subject matter of Examples 14 to 24 can optionally include wherein the partial mobile radio cell search includes a reference signal receive power (RSRP) or reference signal receive quality (RSRQ) measurement.

In Example 25, the subject matter of Examples 14 to 24 can optionally include wherein the received wireless signals are processed in accordance with a Universal Mobile Telecommunications System (UMTS) network.

In Example 26, the subject matter of Examples 14 to 24 can optionally include wherein the received wireless signals are processed in accordance with a Long Term Evolution (LTE) network.

In Example 27, the subject matter of Examples 14 to 24 can optionally include wherein the received wireless signals are processed in accordance with a Long Term Evolution Advanced (LTE-A) network.

Example 28 is a method for performing a mobile radio cell search. The method includes receiving one or more wireless signals from one or more mobile radio cells; determining a reliability metric for each of the one or more mobile radio cells based on a signal level measurement of one of the wireless signals; and performing a partial mobile radio cell search only for mobile radio cells having a reliability metric that satisfies a predefined criterion.

In Example 29, the subject matter of Example 28 can optionally include updating a list of valid candidate mobile radio cells based on a result of the partial mobile radio cell search.

In Example 30, the subject matter of Example 28 or 29 can optionally include wherein the signal level measurement is a first signal power measurement, and wherein the predefined criterion is a signal power threshold.

In Example 31, the subject matter of Example 30 can optionally include wherein the partial mobile radio cell search includes a second signal power or signal quality measurement, and wherein the first signal power measurement is completed in a shorter time period than the second signal power or signal quality measurement.

In Example 32, the subject matter of Examples 28 to 31 can optionally include wherein the reliability metric for each cell is based on a measurement of a synchronization sequence contained in one of the received wireless signals or a cell specific reference signal.

In Example 33, the subject matter of Examples 28 to 31 can optionally include wherein the partial mobile radio cell search includes a reference signal receive power (RSRP) or reference signal receive quality (RSRQ) measurement.

In Example 34, the subject matter of Examples 28 to 33 can optionally include wherein the received wireless signals are processed in accordance with a Universal Mobile Telecommunications System (UMTS) network.

In Example 35, the subject matter of Examples 28 to 33 can optionally include wherein the received wireless signals are processed in accordance with a Long Term Evolution (LTE) network.

In Example 36, the subject matter of Examples 28 to 33 can optionally include wherein the received wireless signals are processed in accordance with a Long Term Evolution Advanced (LTE-A) network.

Example 37 is a mobile radio communication terminal device. The mobile radio communication terminal device includes a receiver configured to receive one or more wireless signals from one or more mobile radio cells; a first circuit configure to determine a reliability metric for each of the one or more mobile radio cell based on a signal level measurement of one of the wireless signals; and a second circuit configured to perform a partial mobile radio cell search only for mobile radio cells having a reliability metric that satisfies a predefined criterion.

In Example 38, the subject matter of Example 37 can optionally include wherein the second circuit is further configured to update a list of valid candidate mobile radio cells based on a result of the partial mobile radio cell search.

In Example 39, the subject matter of Example 37 or 38 can optionally include wherein the signal level measurement is a first signal power measurement, and wherein the predefined criterion is a signal power threshold.

In Example 40, the subject matter of Example 39 can optionally include wherein the partial mobile radio cell search includes a second signal power or signal quality measurement, and wherein the first signal power measurement is completed in a shorter time period than the second signal power or signal quality measurement.

In Example 41, the subject matter of Examples 37 to 40 can optionally include wherein each reliability metric is determined based on a measurement of a synchronization sequence contained in one of the received wireless signals or a cell specific reference signal.

In Example 42, the subject matter of Examples 37 to 41 can optionally include wherein the partial mobile radio cell search includes a reference signal receive power (RSRP) or a reference signal receive quality (RSRQ) measurement.

In Example 43, the subject matter of Examples 37 to 42 can optionally include wherein the received wireless signals are processed in accordance with a Universal Mobile Telecommunications System (UMTS) network.

In Example 42, the subject matter of Examples 37 to 42 can optionally include wherein the received wireless signals are processed in accordance with a Long Term Evolution (LTE) network.

In Example 43, the subject matter of Example 37 to 42 can optionally include wherein the received wireless signals are processed in accordance with a Long Term Evolution Advanced (LTE-A) network Example 44 is a method for performing a mobile radio cell search. The method include performing a first partial mobile radio cell search, which includes receiving one or more wireless signals from one or more mobile radio cells; and determining a reliability metric and a mobile radio cell detection occurrence count for each of the one or more mobile radio cells based on the one or more received wireless signals. The method further includes performing a second partial mobile radio cell search only for mobile radio cells having a reliability metric or a mobile radio cell detection occurrence count that satisfies a predefined criterion.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile radio communication terminal device comprising:
   a receiver configured to receive one or more wireless signals from one or more mobile radio cells;
   a first circuit configured to determine a reliability metric and cell identity information for the one or more mobile radio cells based on the one or more received wireless signals;
   a second circuit configured to identify a first set of the one or more mobile radio cells by comparing the cell identity information to cell identity information of one or more previously detected mobile radio cells, and to identify a second set of the one or more mobile radio cells that have reliability metrics that satisfy a predefined criterion; and
   a third circuit configured to perform a partial mobile radio cell search for the first set and the second set of the one or more mobile radio cells.

2. The mobile radio communication terminal device of claim 1, wherein the third circuit is further configured to update a list of valid candidate mobile radio cells based on a result of the partial mobile radio cell search.

3. The mobile radio communication terminal device of claim 1, wherein the second circuit is configured to identify the first set of the one or more mobile radio cells as mobile radio cells that have been detected by the first circuit more than a predefined number of times.

4. The mobile radio communication terminal device of claim 1, wherein at least one of the reliability metrics determined by the first circuit is a signal power measurement.

5. The mobile radio communication terminal device of claim 4, wherein the predefined criterion is a signal power threshold or a number of past mobile radio cell detection occurrences.

6. The mobile radio communication terminal device of claim 5, wherein the third circuit is configured to perform the partial mobile radio cell search for one or more mobile radio cells having a signal power measurement that satisfies a predefined threshold or for one or more mobile radio cells that have been previously detected at least one time.

7. The mobile radio communication terminal device of claim 6, wherein the partial mobile radio cell search comprises a signal power or signal quality measurement, and wherein the signal power measurement performed by the first circuit is completed in a shorter time period than the signal power or signal quality measurement of the partial mobile radio cell search.

8. The mobile radio communication terminal device of claim 1, wherein each reliability metric is determined based on a measurement of a synchronization sequence contained in one of the received wireless signals or a cell specific reference signal.

9. The mobile radio communication terminal device of claim 1, wherein the second circuit is configured to provide the cell identity information of the first set and the second set of the one or more mobile radio cells to the third circuit, and wherein the third circuit is configured to perform the partial mobile radio cell search according to the cell identity information.

10. The mobile radio communication terminal device of claim 1, wherein the second circuit is configured to maintain a mobile radio cell detection history that indicates contains cell identity information for mobile radio cells that have been previously detected, and is configured to compare the cell identity information of the one or more mobile radio cells to the cell identity information in the mobile radio cell detection history to identify the first set of the one or more radio cells.

11. The mobile radio communication terminal device of claim 1, wherein the partial mobile radio cell search comprises a reference signal receive power (RSRP) or reference signal receive quality (RSRQ) measurement.

12. A method for performing a mobile radio cell search, the method comprising:
   performing a first partial mobile radio cell search comprising:
      receiving one or more wireless signals from one or more mobile radio cells;
      determining a reliability metric and cell identity information for the one or more mobile radio cells based on the one or more received wireless signals;
   identifying a first set of the one or more mobile radio cells by comparing the cell identity information of the one or more mobile radio cells to cell identity information of one or more previously detected mobile radio cells, and identifying a second set of the one or more mobile radio cells that have reliability metrics that satisfy a predefined criterion; and
   performing a second partial mobile radio cell search for the first set and the second set of the one or more mobile radio cells.

13. The method of claim 12, further comprising updating a list of valid candidate mobile radio cells based on a result of the second partial mobile radio cell search.

14. The method of claim 12, wherein each reliability metric is determined based on a measurement of a synchronization sequence contained in one of the received wireless signals or a cell specific reference signal.

15. A mobile radio communication terminal device comprising:
   a receiver configured to receive one or more wireless signals from one or more mobile radio cells;
   a first circuit configured to determine a reliability metric and cell identity information for a first mobile radio cell of the one or more mobile radio cells based on the one or more wireless signals; and
   a second circuit configured to perform a partial mobile radio cell search for a set of the one or more mobile radio cells that have a reliability metric that satisfies a predefined criterion or that have been previously detected at least a predefined number of times, wherein the partial mobile radio cell search uniquely targets the set of the one or more mobile radio cells according to the cell identity information of the set of the one or more mobile radio cells.

16. The mobile radio communication terminal device of claim 15, wherein the second circuit is further configured to update a list of valid candidate mobile radio cells based on a result of the partial mobile radio cell search.

17. The mobile radio communication terminal device of claim 15, wherein the signal level measurement is a first signal power measurement, and wherein the predefined criterion is a signal power threshold.

18. The mobile radio communication terminal device of claim 15, wherein the partial mobile radio cell search comprises a second signal power or signal quality measurement.

19. The mobile radio communication terminal device of claim 15, wherein each reliability metric is determined based on a measurement of a synchronization sequence contained in one of the received wireless signals or a cell specific reference signal.

20. The mobile radio communication terminal device of claim 15, wherein the partial mobile radio cell search comprises a reference signal receive power (RSRP) or a reference signal receive quality (RSRQ) measurement.

* * * * *